(12) United States Patent
Dong et al.

(10) Patent No.: US 11,262,486 B2
(45) Date of Patent: Mar. 1, 2022

(54) OPTICAL LENS, GLASSES AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Ruijun Dong, Beijing (CN); Hao Zhang, Beijing (CN); Chenru Wang, Beijing (CN); Xuebing Zhang, Beijing (CN); Yali Liu, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 153 days.

(21) Appl. No.: 16/492,630

(22) PCT Filed: Dec. 7, 2018

(86) PCT No.: PCT/CN2018/119808
§ 371 (c)(1),
(2) Date: Sep. 10, 2019

(87) PCT Pub. No.: WO2019/110009
PCT Pub. Date: Jun. 13, 2019

(65) Prior Publication Data
US 2020/0049981 A1 Feb. 13, 2020

(30) Foreign Application Priority Data
Dec. 7, 2017 (CN) .......................... 201711284760.X

(51) Int. Cl.
*G02B 27/00* (2006.01)
*G02B 3/08* (2006.01)
(Continued)

(52) U.S. Cl.
CPC ................. *G02B 3/08* (2013.01); *G02B 3/04* (2013.01); *G02B 27/0081* (2013.01); *G02C 7/022* (2013.01); *G02C 7/06* (2013.01)

(58) Field of Classification Search
CPC ........ G02B 27/0081; G02B 3/04; G02B 3/08; G02B 3/02; G02B 3/06; G02B 3/10; G02C 7/06; G02C 7/022; F21V 5/04
See application file for complete search history.

(56) References Cited

U.S. PATENT DOCUMENTS

| 4,210,391 A | 7/1980 | Cohen |
| 4,995,715 A | 2/1991 | Cohen |

(Continued)

FOREIGN PATENT DOCUMENTS

CN 106896431 * 6/2017 ......... G02B 27/0101

OTHER PUBLICATIONS

Machine Translation of CN 106896431 (Year: 2017).*
Extended European Search Report for Application No. 18886633.9, dated Jul. 5, 2021, 8 Pages.

*Primary Examiner* — Darryl J Collins
*Assistant Examiner* — Matthew Y Lee
(74) *Attorney, Agent, or Firm* — Brooks Kushman P.C.

(57) ABSTRACT

The present disclosure provides an optical lens, glasses and a display device. The optical lens includes: a first surface, a second surface, a first lens portion and a second lens portion. The optical lens is a convex lens. The first surface and the second surface are at two side surfaces of the optical lens. The first surface is a convex aspheric surface, and the second surface is a Fresnel surface with a recessed curved base. The
(Continued)

first lens portion and the second lens portion are adjacent each other and connected in a direction perpendicular to a main optical axis of the optical lens. A first focal point of the first lens portion and a second focal point of the second lens portion are on the main optical axis, and a focal length of the second lens portion is greater than a focal length of the first lens portion.

16 Claims, 5 Drawing Sheets

(51) Int. Cl.
     *G02B 3/04*           (2006.01)
     *G02C 7/02*           (2006.01)
     *G02C 7/06*           (2006.01)

(56) References Cited

U.S. PATENT DOCUMENTS

| | | | |
|---|---|---|---|
| 2009/0002848 A1 | 1/2009 | Yasumoto et al. | |
| 2009/0279189 A1* | 11/2009 | Getman | G02B 27/0075 |
| | | | 359/724 |
| 2017/0031165 A1* | 2/2017 | Costa | G02B 27/017 |

* cited by examiner

|   | R | r | Fresnel 1 | Fresnel 2 |
|---|---|---|---|---|
| A | 8.00E-04 | -0.0007995 | -0.009796 | -1.20E-02 |
| B | -3.419E-08 | 8.985E-07 | -0.00001878 | -0.000003888 |
| C | 2.002E-10 | 2.933E-10 | 3.383E-09 | -9.298E-10 |
| D | -4.961E-14 | 1.331E-13 | -8.293E-12 | 5.515E-13 |
| E | -4.941E-19 | 5.621E-17 | 2.386E-15 | -1.398E-16 |
| K | -3.017 | -3.326 | 360.458 | -4.992 |
FIG. 5
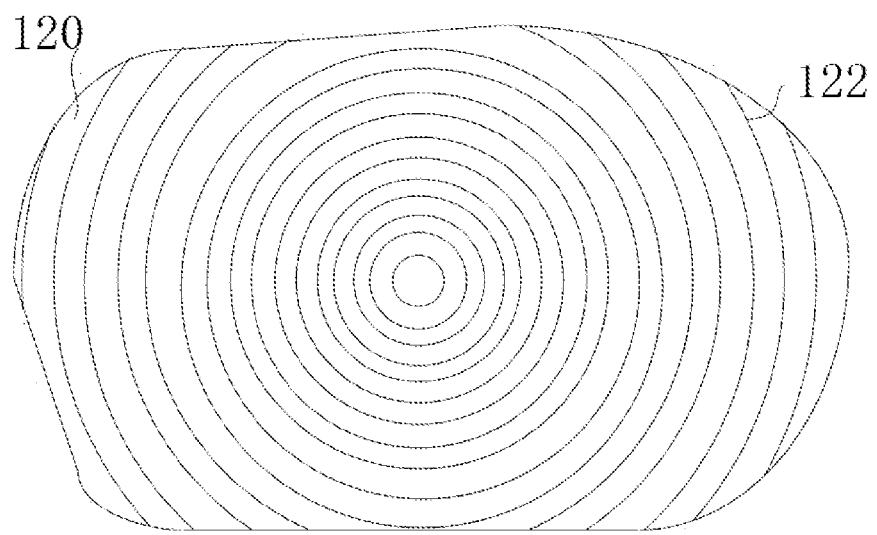
FIG. 6
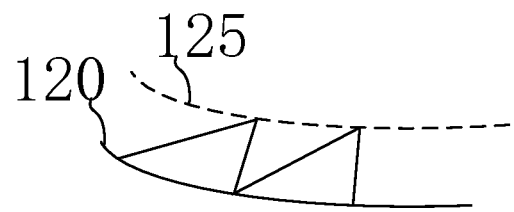
FIG. 7

OPTICAL LENS, GLASSES AND DISPLAY DEVICE

CROSS-REFERENCE TO RELATED APPLICATIONS

This application is the U.S. national phase of PCT Application No. PCT/CN2018/119808 filed on Dec. 7, 2018, which claims priority to Chinese Patent Application No. 201711284760.X filed on Dec. 7, 2017, which are incorporated herein by reference in their entireties.

TECHNICAL FIELD

The present disclosure relates to the field of display technologies, and in particular, to an optical lens, glasses, and a display device.

BACKGROUND

With advancement of technology and improvement of display technologies, some display technologies such as the 3D holographic display technology, the virtual reality (VR) display technology and the augmented reality (AR) have been derived from the original flat display technology.

Most of the 3D holographic display technology, the VR display technology and the AR display technology are realized via certain optical glasses or optical systems. However, viewing angles of the optical glasses or optical systems in the related art are mostly concentrated in front. Further, field angles of the optical glasses or optical systems in the related art are small, particularly far less than the field angle of the human eyes, and cannot satisfy the visual range of the human eyes.

SUMMARY

One embodiment of the present disclosure provides an optical lens includes: a first surface, a second surface, a first lens portion and a second lens portion. The optical lens is a convex lens. The first surface and the second surface are at two side surfaces of the optical lens. The first surface is a convex aspheric surface, and the second surface is a Fresnel surface with a recessed curved base. The first lens portion and the second lens portion are adjacent each other and connected in a direction perpendicular to a main optical axis of the optical lens. A first focal point of the first lens portion and a second focal point of the second lens portion are on the main optical axis, and a focal length of the second lens portion is greater than a focal length of the first lens portion.

One embodiment of the present disclosure further provides a pair of glasses, including the above optical lens.

One embodiment of the present disclosure further provides a display device including the above pair of glasses.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

FIG. 5 is a table showing surface parameters of the optical lens shown in FIG. 1;

FIG. 6 is a schematic view showing a Fresnel ring in an optical lens;

FIG. 7 is a partial enlarged schematic view of the Fresnel ring; and

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
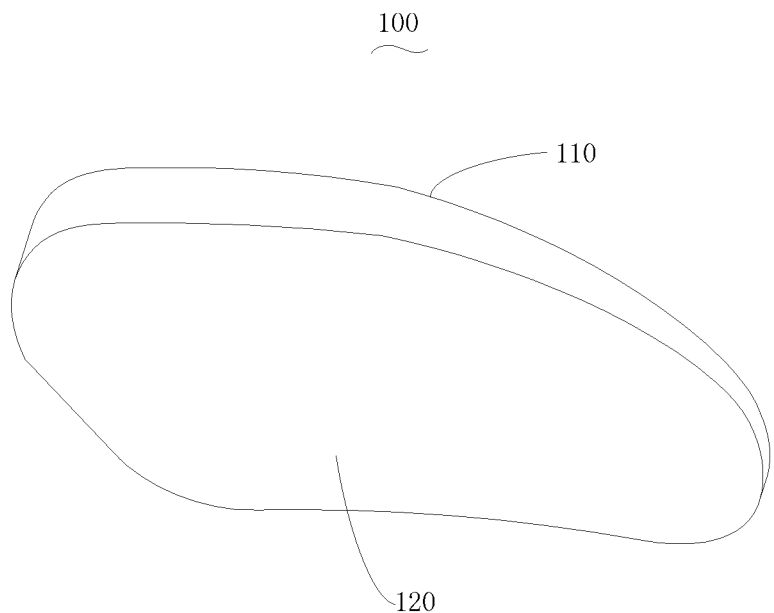
FIG. 1 is a perspective view of an optical lens according to an embodiment of the present disclosure.
Figure 2:
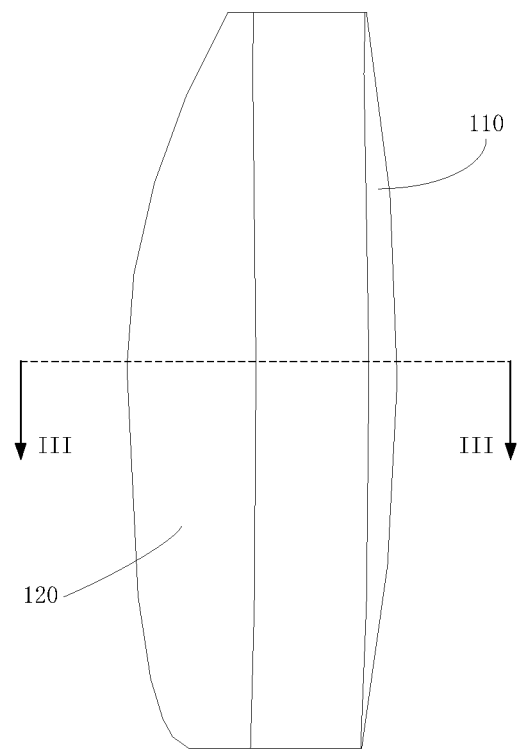
FIG. 2 is a side view of the optical lens shown in FIG. 1.
Figure 3:
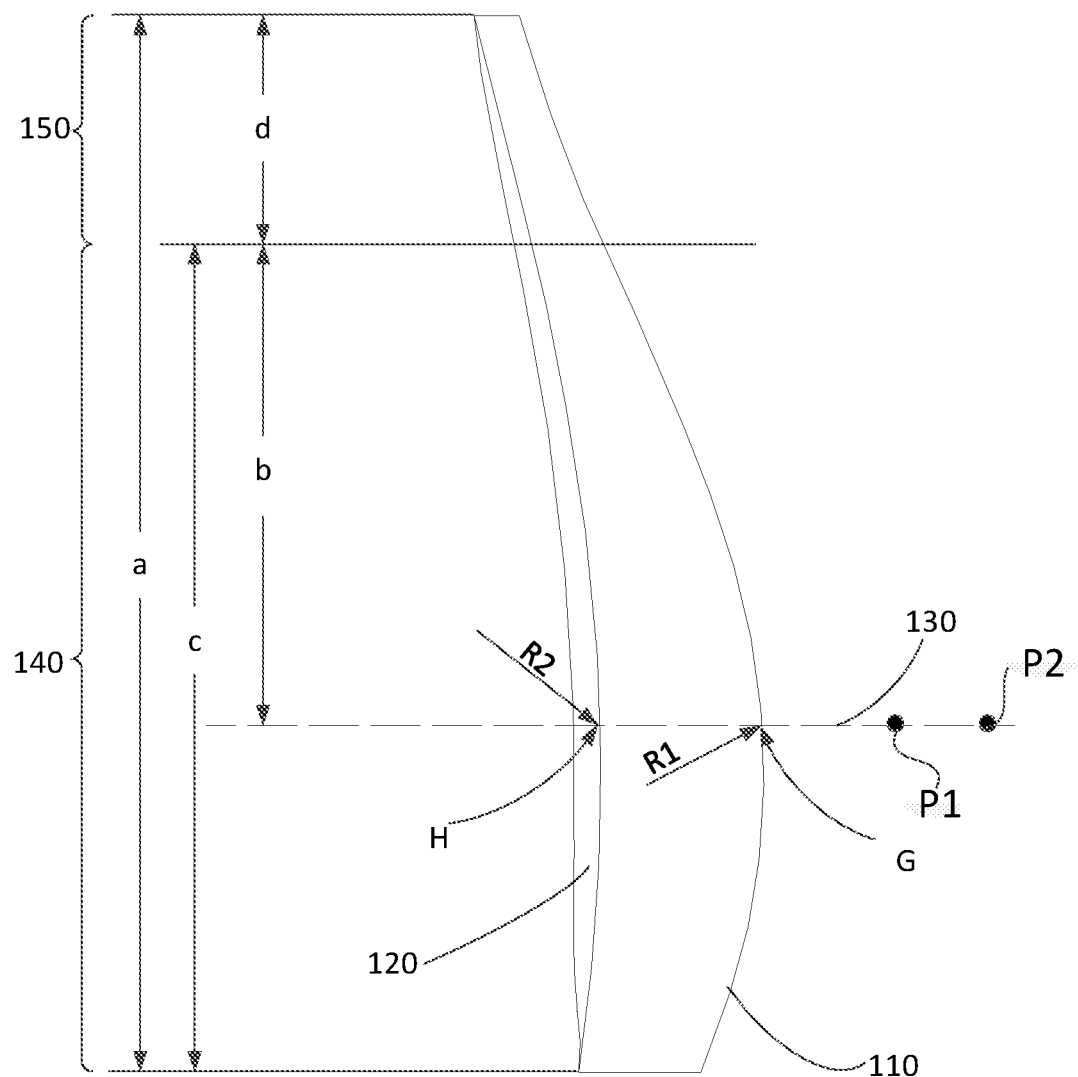
FIG. 3 is a cross-sectional view of the optical lens shown in FIG. 2 taken along a line III-III.

Referring to FIG. 1 to FIG. 3, FIG. 1 is a perspective view of an optical lens according to an embodiment of the present disclosure, FIG. 2 is a left side view of the optical lens shown in FIG. 1, and FIG. 3 is a cross-sectional view of the optical lens shown in FIG. 2 taken along a line III-III. As shown in FIG. 1 to FIG. 3, one embodiment of the present disclosure provides an optical lens 100. The optical lens 100 is a convex lens as a whole. The optical lens 100 includes a first surface 110 and a second surface 120. The first surface 110 and the second surface 120 are located at two sides of the optical lens 100. The first surface 110 is an aspheric surface that protrudes toward an outside of the optical lens 100. The second surface 120 is a curved surface that is recessed in a direction toward the first surface 110. The second surface 120 is also an aspheric surface. Fresnel rings (as shown in FIG. 6) composed of a plurality of concentric rings 122 are disposed on the second surface 120. Taking the recessed curved surface as a base, the Fresnel rings together define a Fresnel surface with a curved base, thereby forming the second surface 120.

In one embodiment, as shown in FIG. 6 and FIG. 7, the Fresnel ring may include a plurality of serrated concentric rings 122 that are sequentially connected. These serrated concentric rings 122 are located between the second surface 120 and a surface 125 which is parallel with the second surface 120. In other words, these serrated concentric rings 122 have an identical height relative to the second surface 120, that is, the serrated concentric rings 122 of the Fresnel ring are of equal height design, i.e., the height of each ring is the same, which is not limited thereto. In other embodiments, the serrated concentric rings 122 of the Fresnel ring may also be designed with equal ring spacing.

In one embodiment, the height of the serrated concentric ring 122 of the Fresnel ring relative to the second surface 120 is 0.5 mm. From a center to an edge of the optical lens 100, the maximum number of serrated concentric rings 122 is 38.

The optical lens 100 includes a main optical axis 130. A projection of the optical lens 100 to a plane perpendicular to the main optical axis 130 is substantial an ellipse. In the projection of the optical lens 100 to the plane perpendicular to the main optical axis 130, the diameter a in a long axis direction of the optical lens 100 (i.e., a direction from top to bottom when the optical lens 100 is in the position shown in FIG. 3) is 50 mm to 52 mm. The diameter a is the distance between two farthest points along the long axis direction of the optical lens 100 in the projection of the optical lens 100 to the plane perpendicular to the main optical axis 130.

In one embodiment, the length of the diameter a is the length of a long axis of the optical lens 100.

Optionally, in one embodiment, in the projection of the optical lens 100 to the plane perpendicular to the main optical axis 130, the diameter a in the long axis direction of the optical lens 100 is 51.2 mm.

The curvature radius R1 of the optical lens 100 at an apex G intersecting the main optical axis 130 on the first surface 110 is −81 mm to −81.5 mm. The curvature radius R2 of the optical lens 100 at an apex H intersecting the main optical axis 130 on the second surface 120 is −32.5 mm to 33.5 mm.

Optionally, in one embodiment, the curvature radius of the optical lens 100 at the apex G intersecting the main optical axis 130 on the first surface 110 is −81.245 mm. The curvature radius of the optical lens 100 at the apex H intersecting the main optical axis 130 on the second surface 120 is −32.947 mm.

The center of the optical lens 100 has a thickness in a range of from 7 mm to 9 mm. That is, a distance between the apex G of the optical lens 100 and the apex H of the optical lens 100 is a range of from 7 mm to 9 mm. Optionally, in one embodiment, the center of the optical lens 100 has a thickness of 8 mm.

The optical lens 100 includes a first lens portion 140 and a second lens portion 150. The first lens portion 140 and the second lens portion 150 are adjacent each other and connected in a direction perpendicular to the main optical axis 130 of the optical lens 100. The second lens portion 150 is located at an outer side of the first lens portion 140 distal to the main optical axis 130. A projection of the second lens portion 150 to the plane perpendicular to the main optical axis 130 has an end adjacent the main optical axis 130, and a distance b between the main optical axis 130 and the end adjacent the main optical axis 130 is 24.6 mm. In other words, the first lens portion 140 and the second lens portion 150 are divided at a position which is 24.6 mm away from the main optical axis 130 in the long axis direction of the optical lens 100. The first lens portion 140 has a first focal length, and the second lens portion 150 has a second focal length.

In a projection of the first lens portion 140 to the plane perpendicular to the main optical axis 130, the diameter c in the long axis direction of the optical lens 100 is 37 mm to 41 mm. Optionally, in one embodiment, in the projection of the first lens portion 140 to the plane perpendicular to the main optical axis 130, the diameter c in the long axis direction of the optical lens 100 is 39.2 mm.

In a projection of the second lens portion 150 to the plane perpendicular to the main optical axis 130, the diameter d in the long axis direction of the optical lens 100 is 11 mm to 13 mm. Optionally, in one embodiment, in the projection of the second lens portion 150 to the plane perpendicular to the main optical axis 130, the diameter d in the long axis direction of the optical lens 100 is 12 mm.

The first lens portion 140 has a first main optical axis and the second lens portion 150 has a second main optical axis. Each of the first main optical axis of the first lens portion 140 and the second main optical axis of the second lens portion 150 coincides with the main optical axis 130. It can ensure definition of the central field of view to the most extent by causing each of the first main optical axis of the first lens portion 140 and the second main optical axis of the second lens portion 150 to coincide with the main optical axis 130.

The first lens portion 140 has a first focal point P1 and the second lens portion 150 has a second focal point P2. The first focal point P1 of the first lens portion 140 and the second focal point P2 of the second lens portion 150 are on the main optical axis 130. A focal length of the second lens portion 150 is greater than a focal length of the first lens portion 140. In other words, the first focal point of the first lens portion 140 and the second focal point of the second lens portion 150 are on different positions of the main optical axis 130. At this point, the second focal length of the second lens portion 150 refers to a distance from the second focal point P2 to the point G, and the first focal length of the first lens portion 140 refers to a distance from the first focal point P1 to the point G.

The focal length of the first lens portion 140 is in a range of from 35 mm to 50 mm. The focal length of the second lens portion 150 is in a range of from 80 mm to 100 mm. In order to ensure definition of imaging of the optical lens 100, a difference between the focal length of the first lens portion 140 and the focal length of the second lens portion 150, is preferably maintained at about 50 mm.

Optionally, in one embodiment, the focal length of the first lens portion 140 is 50 mm, and the focal length of the second lens portion 150 is 100 mm.

A first Fresnel ring is disposed on the second surface 120 in the first lens portion 140. The curvature radius of the first Fresnel ring is in a range of 635 mm to 636 mm. A second Fresnel ring is disposed on the second surface 120 in the second lens portion 150. The curvature radius of the second Fresnel ring is in a range of 39 mm to 41 mm. The first Fresnel ring and the second Fresnel ring together define the Fresnel rings on the second surface 120, and the Fresnel rings together with the curved base define the Fresnel surface.

Optionally, the curvature radius of the first Fresnel ring is 635.3 mm. The curvature radius of the second Fresnel ring is 40 mm.

Figure 4:
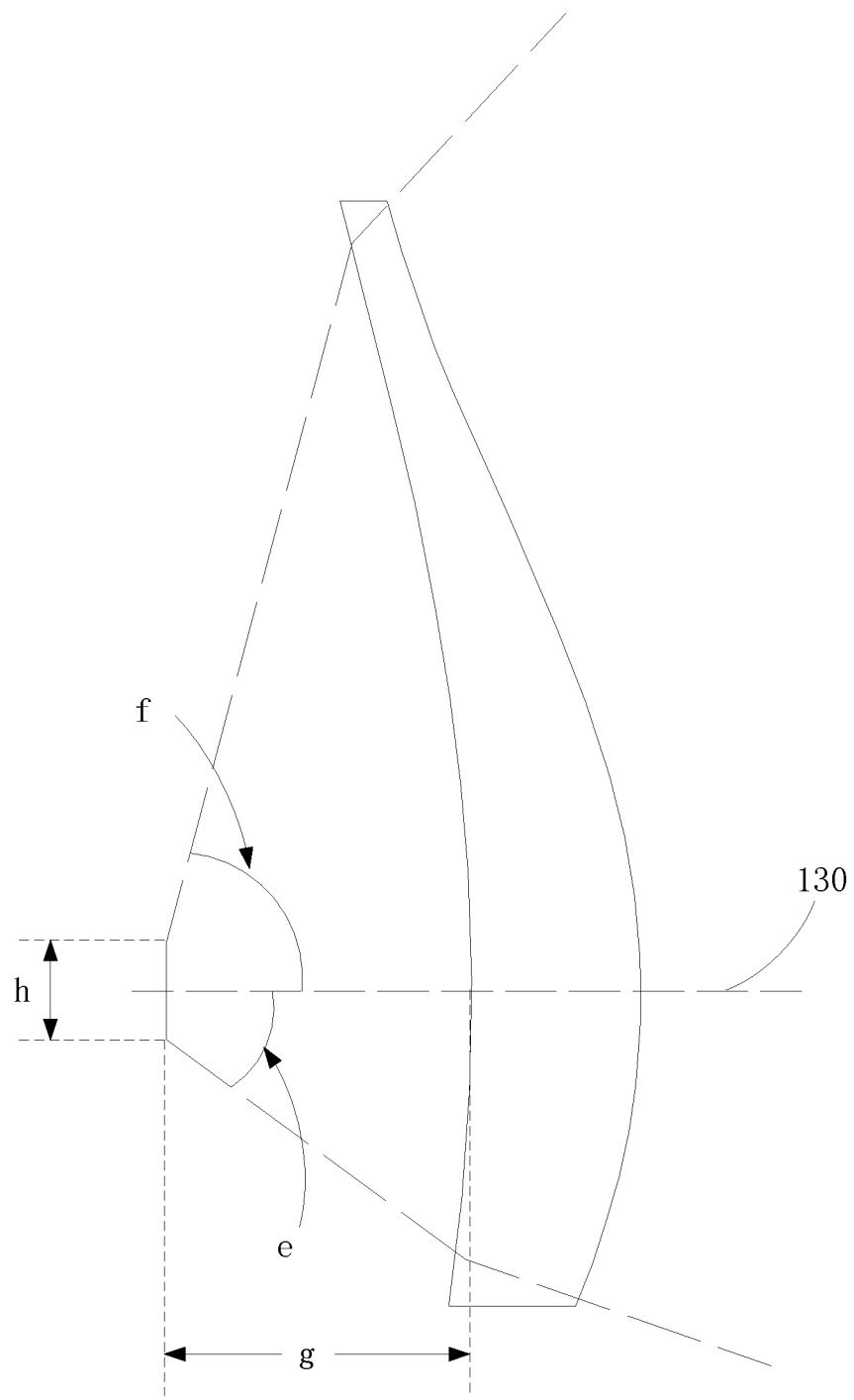
FIG. 4 is a schematic view showing optical paths of the optical lens shown in FIG. 3.

Referring to FIG. 4, FIG. 4 is a schematic view showing optical paths of the optical lens shown in FIG. 3. As shown in FIG. 4, at an inner side of the optical lens 100, i.e., an end closer to the main optical axis 130 in the long axis direction of the optical lens 100, a viewing angle range e can reach 36.14 degrees. At an outer side of the optical lens 100, i.e., an end farther from the main optical axis 130 in the long axis direction of the optical lens 100, a viewing angle range f can reach 75 degrees. Thus, the field of view of the optical lens 100 in the horizontal direction can reach 111.14 degrees.

Further, when the optical lens 100 is used for both eyes, the binocular field of view of the human eye can reach 172.6 degrees, which greatly improves the visual range of the binocular field of view of the human eye and approaches the limit of the field of view of the human eye.

The exit pupil distance g of the optical lens 100 is in a range of 13 mm to 15 mm. The exit pupil diameter h of the optical lens 100 is in a range of 3.5 mm to 4.5 mm.

Optionally, in one embodiment, the exit pupil distance g of the optical lens 100 is 14 mm, and the exit pupil diameter h of the optical lens 100 is 4 mm.

According to the optical lens 100 provided by some embodiments of the present disclosure, by partitioning and optimizing different fields of view, the first lens portion 140 and the second lens portion 150 are provided at the optical lens 100, thereby extending the field of view angle of the optical lens 100. Further, the shape of the lens is designed according to asymmetry in all directions of the field of view of the human eye, thereby greatly increasing the field of view of the optical lens.

Further, referring to FIG. 5, FIG. 5 is a table showing surface parameters of the optical lens shown in FIG. 1. As shown in FIG. 5, each of the first surface 110 and the second surface 120 of the optical lens 100 is an even aspheric surface, and may be obtained via calculation through the following formula:

$$z = \frac{h^2}{R(1 \pm \sqrt{1-(1+k)h^2/R^2}\,)} + Ah^2 + Bh^4 + Ch^6 + Dh^8 + Eh^{10}$$

where R is the radius of one point when calculating a surface shape of the one point on the first surface 110; h is the radius of one point when calculating a surface shape of the one point on the second surface 120; K represents a cone degree; A, B, C, D, and E are polynomial coefficients, respectively. A, B, C, D and E can select appropriate parameters when calculating surface shapes of the first surface 110 and the second surface 120, respectively. For example, when calculating the surface shape of the first surface 110, parameter values in the first column may be used; when calculating the surface shape of the Fresnel surface of the first lens portion 140, parameter values in the third column may be used.

Correspondingly, since the first lens portion 140 and the second lens portion 150 are defined on the optical lens 100, and the focal length of the first lens portion 140 is different from the focal length of the second lens portion 150, and the focal length of the second lens portion 150 is greater than the focal length of the first lens portion 140, then, there is an obvious inflection point or bend point at a connection position between the first lens portion 140 and the second lens portion 150. The inflection point or bend point may be on the first surface 100, at the connection position between the first lens portion 140 and the second lens portion 150. In other words, there is an obvious inflection point or bend point at the first surface 110 while the curved surface on the second surface 120 is relatively smooth without obvious inflection point or bending point. The inflection point or bend point may be on the second surface 120, at the connection position between the first lens portion 140 and the second lens portion 150. In other words, there is an obvious inflection point or bend point at the second surface 120 while the curved surface on the first surface 110 is relatively smooth without obvious inflection point or bending point. The inflection point or bend point may be on the first surface 110 and the second surface 120, at the connection position between the first lens portion 140 and the second lens portion 150. In other words, there is an obvious inflection point or bend point at the second surface 120 and the first surface 110. Specifically, setting the inflection point or bend point on which surface may be set according to design requirements, which is not strictly limited.

Correspondingly, since the optical lens provided by some embodiments of the present disclosure can be applied to a pair of glasses with a large field of view, one embodiment of the present disclosure further provides a pair of glasses. The pair of glasses includes the above optical lens. The above embodiments of the optical lens may be applied to embodiments of the glasses.

Figure 8:
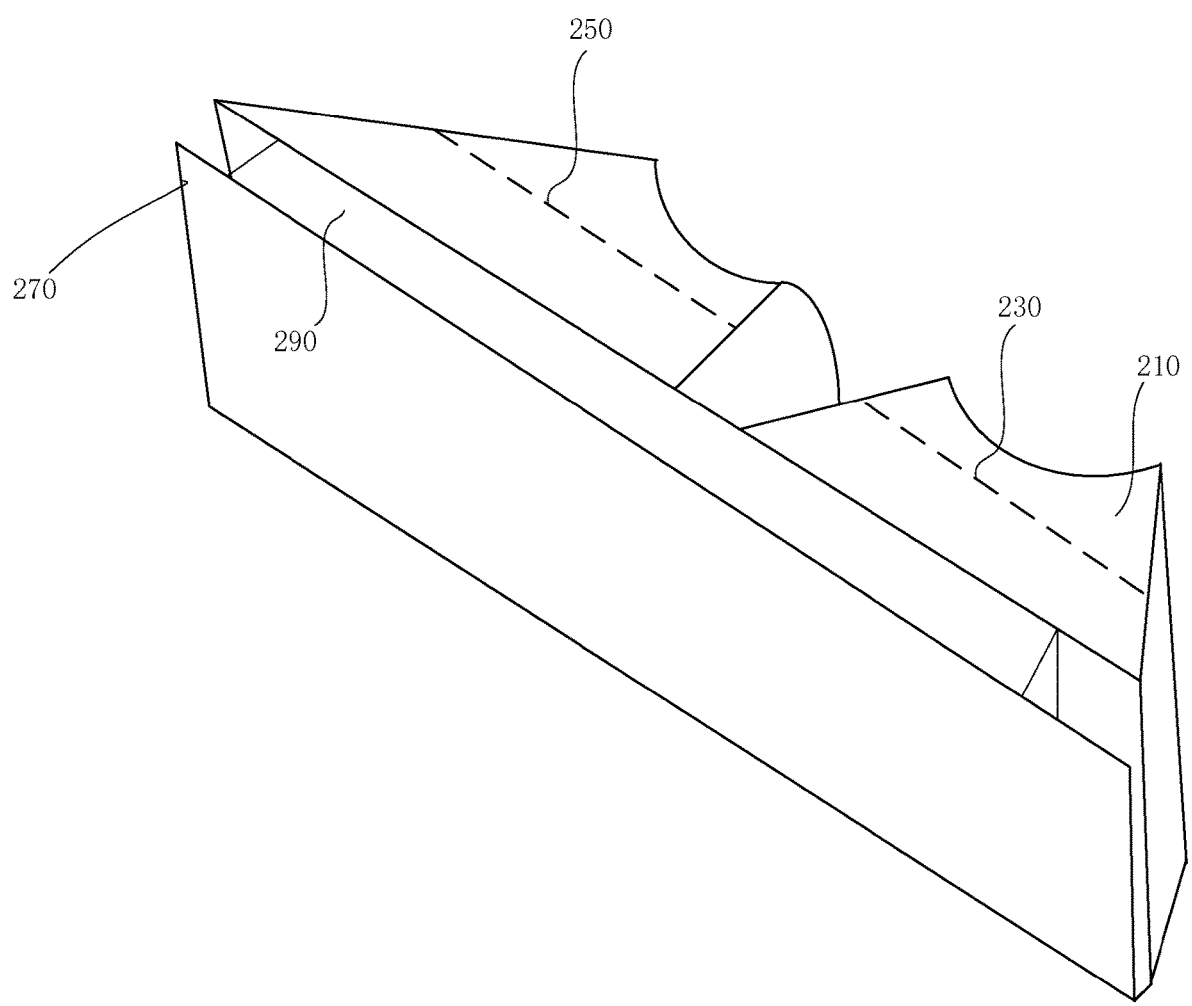
FIG. 8 is a schematic diagram of a pair of eyeglass according to an embodiment of the present disclosure.

Specifically, as shown in FIG. 8, the glasses include a body 210, a first lens 230 in the body 210, a second lens 250 in the body 210, and a clamping portion 270 disposed at an outside the body 210. Each of the first lens 230 and the second lens 250 may adopt the above optical lens. The clamping portion 270 may be used to clamp a mobile phone 290 etc.

During use, one user can insert the mobile phone 290 into the clamping portion 270, thereby fixing the mobile phone 290 to the glasses. Then, the mobile phone 290 plays the video, and the user can watch the video through the glasses. As each of the first lens 230 and the second lens 250 may adopt the above optical lens, each optical lens includes the first lens portion and the second lens portion, and the focal length of the second lens portion is greater than the focal length of the first lens portion, then, the range and definition of an edge field of view formed by the second lens portion can be increased while ensuring definition of the central field of view formed by the first lens portion. This further can simplify and expand the imaging of large viewing angles, thereby providing clear images in the direction of large viewing angles and then improving the immersion of display devices.

Correspondingly, since the pair of glasses provided by some embodiments of the present disclosure can be applied to immersive display devices, such as VR devices or AR devices, then, one embodiment of the present disclosure further provides a display device. The display device includes the pair of glasses described above. The pair of glasses includes the above optical lens. The above embodiments of the optical lens may be applied to embodiments of the display device.

Specifically, as shown in FIG. 8, the display device may include the pair of glasses described above and a display screen. The display screen may be disposed in the body 210 of the glasses and spaced apart from the first lens 230 and the second lens 250. The display screen may be a screen of the mobile phone 290 that is inserted into the clamping portion 270. As each of the first lens 230 and the second lens 250 of the glasses may adopt the above optical lens, each optical lens includes the first lens portion and the second lens portion, and the focal length of the second lens portion is greater than the focal length of the first lens portion, then, the range and definition of an edge field of view formed by the second lens portion can be increased while ensuring definition of the central field of view formed by the first lens portion. This further can simplify and expand the imaging of large viewing angles, thereby providing clear images in the direction of large viewing angles and then improving the immersion of display devices.

According to the optical lens, the glasses and the display device provided by some embodiments of the present disclosure, the optical lens is a convex lens, the first surface of the optical lens is a convex aspheric surface, and the second surface of the optical lens opposite to the first surface is a Fresnel surface with a curved base. The optical lens includes the first lens portion and the second lens portion. The first lens portion and the second lens portion are adjacent each other and connected in a direction perpendicular to the main optical axis of the optical lens. The first focal point of the first lens portion and the second focal point of the second lens portion are on the main optical axis. The focal length of the second lens portion is greater than the focal length of the first lens portion. In this way, the optical lens is a convex lens with each of the first surface and the second surface being a curved surface, by defining the first lens portion and the second lens portion in the direction perpendicular to the main optical axis of the optical lens, causing the first focal point of the first lens portion and the second focal point of the second lens portion to be on the main optical axis, and causing the focal length of the second lens portion to be greater than the focal length of the first lens portion, this can increase the range and definition of an edge field of view formed by the second lens portion while ensuring definition of the central field of view formed by the first lens portion. This further can simplify and expand the imaging of large viewing angles, thereby providing clear images in the direction of large viewing angles and then improving the immersion of display devices.

The above are merely the specific embodiments of the present disclosure, but the protection scope of the present disclosure is not limited thereto, and a person skilled in the art may make improvements and modifications without departing from the principle of the present disclosure, and these improvements and modifications shall also fall within the scope of the present disclosure. Therefore, the protection scope of the present disclosure shall be subject to the protection scope of the claims.

What is claimed is:

1. An optical lens comprising:
a first surface;
a second surface;
a first lens portion; and
a second lens portion;
wherein the optical lens is a single convex lens;
the first surface and the second surface are at two side surfaces of the optical lens, the first surface is an aspheric surface that is convex in a direction away from the second surface, and the second surface is a Fresnel surface with a curved base that is recessed in a direction toward the first surface;
the first lens portion and the second lens portion are adjacent each other and connected in a direction perpendicular to a main optical axis of the optical lens;
a first focal point of the first lens portion and a second focal point of the second lens portion are on the main optical axis, and a focal length of the second lens portion is different from a focal length of the first lens portion;
wherein Fresnel rings composed of a plurality of concentric rings are disposed on the second surface, the Fresnel rings comprise a plurality of serrated concentric rings that are sequentially connected, and the serrated concentric rings have an identical height relative to the second surface;
wherein the focal length of the second lens portion is greater than the focal length of the first lens portion;
wherein the focal length of the first lens portion is in a range of from 35 mm to 50 mm, and the focal length of the second lens portion is in a range of from 80 mm to 100 mm;
wherein a difference between the focal length of the first lens portion 140 and the focal length of the second lens portion 150 is maintained at about 50 mm.

2. The optical lens of claim 1, wherein a first projection of the optical lens to a plane perpendicular to the main optical axis is an ellipse, a diameter in a long axis direction of the ellipse is in a range of from 50 mm to 52 mm.

3. The optical lens of claim 2, wherein in a second projection of the second lens portion to the plane perpendicular to the main optical axis, a diameter in the long axis direction of the ellipse is in a range of from 11 mm to 13 mm.

4. The optical lens of claim 1, wherein a curvature radius of the optical lens at an apex intersecting the main optical axis on the first surface is in a range of from −81 mm to −81.5 mm, and a curvature radius of the optical lens at an apex intersecting the main optical axis on the second surface is in a range of from −32.5 mm to 33.5 mm.

5. The optical lens of claim 1, wherein a first Fresnel ring is disposed on the second surface in the first lens portion; a curvature radius of the first Fresnel ring is in a range of 635 mm to 636 mm; a second Fresnel ring is disposed on the second surface in the second lens portion; and a curvature radius of the second Fresnel ring is in a range of 39 mm to 41 mm.

6. The optical lens of claim 1, wherein an exit pupil diameter of the optical lens is in a range of 3.5 mm to 4.5 mm.

7. The optical lens of claim 1, wherein an exit pupil distance of the optical lens is in a range of 13 mm to 15 mm.

8. A pair of glasses comprising:
a body;
a first lens in the body; and
a second lens in the body;
wherein each of the first lens and the second lens includes an optical lens;
wherein the optical lens includes:
a first surface;
a second surface;
a first lens portion; and
a second lens portion;
wherein the optical lens is a single convex lens;
the first surface and the second surface are at two side surfaces of the optical lens, the first surface is an aspheric surface that is convex in a direction away from the second surface, and the second surface is a Fresnel surface with a curved base that is recessed in a direction toward the first surface;
the first lens portion and the second lens portion are adjacent each other and connected in a direction perpendicular to a main optical axis of the optical lens;
a first focal point of the first lens portion and a second focal point of the second lens portion are on the main optical axis, and a focal length of the second lens portion is different from a focal length of the first lens portion;
wherein Fresnel rings composed of a plurality of concentric rings are disposed on the second surface, the Fresnel rings comprise a plurality of serrated concentric rings that are sequentially connected, and the serrated concentric rings have an identical height relative to the second surface;
wherein the focal length of the second lens portion is greater than the focal length of the first lens portion;
wherein the focal length of the first lens portion is in a range of from 35 mm to 50 mm, and the focal length of the second lens portion is in a range of from 80 mm to 100 mm;
wherein a difference between the focal length of the first lens portion 140 and the focal length of the second lens portion 150 is maintained at about 50 mm.

9. The pair of glasses of claim 8, further comprising a clamping portion disposed at an outside the body.

10. The pair of glasses of claim 8, wherein a first projection of the optical lens to a plane perpendicular to the main optical axis is an ellipse, a diameter in a long axis direction of the ellipse is in a range of from 50 mm to 52 mm.

11. The pair of glasses of claim 10, wherein in a second projection of the second lens portion to the plane perpendicular to the main optical axis, a diameter in the long axis direction of the ellipse is in a range of from 11 mm to 13 mm.

12. The pair of glasses of claim 8, wherein a curvature radius of the optical lens at an apex intersecting the main optical axis on the first surface is in a range of from −81 mm to −81.5 mm, and a curvature radius of the optical lens at an apex intersecting the main optical axis on the second surface is in a range of from −32.5 mm to 33.5 mm.

13. The pair of glasses of claim 8, wherein a first Fresnel ring is disposed on the second surface in the first lens portion; a curvature radius of the first Fresnel ring is in a range of 635 mm to 636 mm; a second Fresnel ring is disposed on the second surface in the second lens portion; and a curvature radius of the second Fresnel ring is in a range of 39 mm to 41 mm.

14. The pair of glasses of claim 8, wherein an exit pupil diameter of the optical lens is in a range of 3.5 mm to 4.5 mm, and an exit pupil distance of the optical lens is in a range of 13 mm to 15 mm.

15. A display device comprising the pair of glasses of claim 8 and a display screen.

16. The display device of claim 15, wherein the pair of glasses further includes a clamping portion disposed at an outside the body; and the display screen is a screen of a mobile phone that is inserted into the clamping portion.

\* \* \* \* \*